V. A. WALLIN.
METHOD OF SKINNING ANIMALS.
APPLICATION FILED NOV. 29, 1916.
1,265,407.
Patented May 7, 1918.
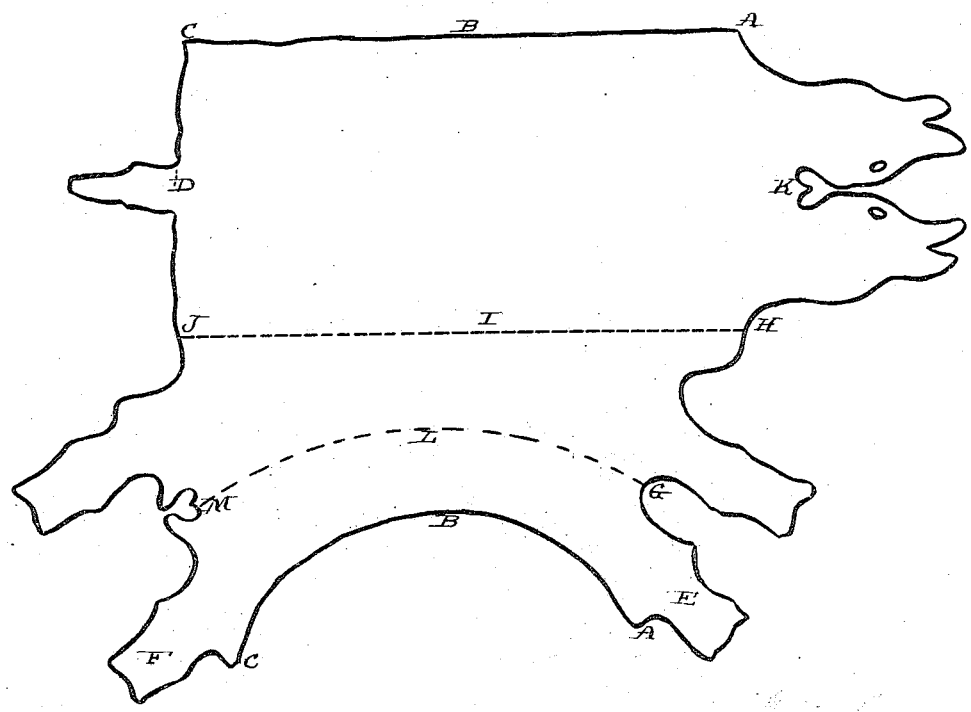
Witnesses
Harold O. Van Antwerp
George E. Schultz
Inventor:
Van A. Wallin
By Cyrus W. Rice
his Attorney

UNITED STATES PATENT OFFICE.

VAN A. WALLIN, OF GRAND RAPIDS, MICHIGAN.

METHOD OF SKINNING ANIMALS.

1,265,407.  Specification of Letters Patent.  Patented May 7, 1918.

Application filed November 29, 1916. Serial No. 134,056.

*To all whom it may concern:*

Be it known that I, VAN A. WALLIN, a citizen of the United States, residing at Grand Rapids, in the county of Kent and State of Michigan, have invented new and useful Improvements in Methods of Skinning Animals, of which the following is a specification.

The present invention relates to methods of skinning animals, and its object is to remove the hide without dividing the belly portion.

Leather made from said belly portion is of a different quality, being thinner and softer, than that made from other portions of the skin. It is nevertheless valuable and suitable for many purposes. Especially is it thus valuable if large pieces of leather can be cut from it.

By my invention, the belly portion is not divided or slit. The drawing shows a hide removed by my method. The skin is slit from a point, as A, below the head and above the fore leg E rearwardly on the line A B C approximately parallel with the spine and to a point, as C, below the tail and above the hind leg F, such line of slitting corresponding with the line of demarcation between the belly portion and the remainder of the hide. It will be seen that as the skin is spread out (as shown in the drawing) the leg portions of the hide are all at one side thereof, and that the belly portion is not slit or cut, but is removed from the animal in a single belly piece.

In the drawing, the letters indicate corresponding parts, and corresponding lines. A slit, indicated by the dotted line, H I J, may of course be made, corresponding to the line A B C, but on the other side of the animal: and the slit A B C may be extended upwardly from its extremities, as from A to K and from C to D. The center line of the belly portion is indicated by the dotted line G L M.

I have described certain lines of slitting whereby my object of removing the hide without dividing the belly portion may be attained: other lines of slitting may obviously be adopted which will also effect my purpose and fall within the limits of my invention.

I claim:—

1. The method of skinning an animal which consists in slitting the hide from a point below the head and above the fore leg to a point below the tail and above the hind leg on the same side.

2. The method of skinning an animal which consists in slitting the hide from a point below the head and above the fore leg to a point below the tail and above the hind leg on the same side, and in extending said slitting upwardly from its extremities.

3. The method of skinning an animal which consists in slitting the hide from a point below the head and above the fore leg and thence rearwardly parallelly with the spine.

4. The method of skinning an animal which consists in slitting the hide at the animal's side on the line between the belly portion and the remainder of the hide.

5. The method of skinning an animal which consists in slitting the hide longitudinally of the animal and above the belly portion, whereby the belly portion is not divided.

In testimony whereof I have hereunto set my hand in presence of two subscribing witnesses, at Grand Rapids, Michigan, this 27th day of November, A. D. 1916.

VAN A. WALLIN.

Witnesses:
 CYRUS W. RICE,
 L. D. AVERILL.

Copies of this patent may be obtained for five cents each, by addressing the "Commissioner of Patents, Washington, D. C."